(12) United States Patent
Groenewolt et al.

(10) Patent No.: US 9,777,190 B2
(45) Date of Patent: Oct. 3, 2017

(54) AQUEOUS POLYURETHANE COATING MATERIAL AND COATINGS PRODUCED THEREFROM AND HAVING HIGH SCRATCH RESISTANCE AND GOOD CHEMICALS RESISTANCE

(75) Inventors: Matthijs Groenewolt, Münster (DE); Manuela Niemeier, Drensteinfurt (DE); Wilfried Stübbe, Greven (DE); Alexandra Steffens, Münster (DE); Britta Schnieders, Meppen (DE)

(73) Assignee: BASF Coatings GmbH, Muenster (DE)

( * ) Notice: Subject to any disclaimer, the term of this patent is extended or adjusted under 35 U.S.C. 154(b) by 586 days.

(21) Appl. No.: 13/980,779

(22) PCT Filed: Jan. 4, 2012

(86) PCT No.: PCT/EP2012/050096
§ 371 (c)(1),
(2), (4) Date: Oct. 2, 2013

(87) PCT Pub. No.: WO2012/098014
PCT Pub. Date: Jul. 26, 2012

(65) Prior Publication Data
US 2014/0037851 A1 Feb. 6, 2014

Related U.S. Application Data

(60) Provisional application No. 61/434,485, filed on Jan. 20, 2011.

(30) Foreign Application Priority Data

Jan. 20, 2011 (EP) .................................... 11151559

(51) Int. Cl.
| | | |
|---|---|---|
| B05D 3/02 | (2006.01) |
| C09D 175/04 | (2006.01) |
| C08G 18/08 | (2006.01) |
| C08G 18/18 | (2006.01) |
| C08G 18/28 | (2006.01) |
| C08G 18/62 | (2006.01) |
| C08G 18/77 | (2006.01) |
| C08G 18/79 | (2006.01) |
| C08G 18/80 | (2006.01) |
| B05D 1/36 | (2006.01) |
| B05D 1/38 | (2006.01) |

(52) U.S. Cl.
CPC .......... *C09D 175/04* (2013.01); *B05D 1/36* (2013.01); *B05D 1/38* (2013.01); *C08G 18/0823* (2013.01); *C08G 18/0866* (2013.01); *C08G 18/1883* (2013.01); *C08G 18/289* (2013.01); *C08G 18/622* (2013.01); *C08G 18/778* (2013.01); *C08G 18/792* (2013.01); *C08G 18/809* (2013.01)

(58) Field of Classification Search
CPC ............ C08G 18/0823; C08G 18/0866; C08G 18/1883; C08G 18/289; C08G 18/622; C08G 18/778; C08G 18/792; C08G 18/809; B05D 1/36; B05D 1/38; C09D 175/04
USPC ................................................ 427/372.2, 387
See application file for complete search history.

(56) References Cited

U.S. PATENT DOCUMENTS

| | | | |
|---|---|---|---|
| 4,598,131 A | 7/1986 | Prucnal | |
| 4,710,542 A | 12/1987 | Forgione et al. | |
| 5,641,829 A * | 6/1997 | Das ................... | C08G 18/6245 524/458 |
| 5,716,678 A | 2/1998 | Rockrath et al. | |
| 5,854,338 A * | 12/1998 | Hovestadt .............. | C03C 17/30 524/588 |
| 2011/0045190 A1* | 2/2011 | Groenewolt ........ | C08G 18/1883 427/385.5 |

FOREIGN PATENT DOCUMENTS

| | | |
|---|---|---|
| DE | 19624972 A1 | 1/1998 |
| DE | 102005045228 A1 | 4/2007 |
| DE | 102007061854 A1 | 6/2009 |
| EP | 0008127 A1 | 2/1980 |
| EP | 0245700 B1 | 11/1987 |

(Continued)

OTHER PUBLICATIONS

English Translation of International Preliminary Report on Patentability for International Application No. PCT/EP2012/050096 issued Jul. 23, 2013, 8 pages.

(Continued)

*Primary Examiner* — Robert S Walters, Jr
(74) *Attorney, Agent, or Firm* — Oblon, McClelland, Maier & Neustadt, L.L.P.

(57) ABSTRACT

Disclosed are aqueous coating compositions comprising at least one hydroxyl-containing compound (A), at least one compound (B) having isocyanate groups and also having hydrolyzable silane groups, and at least one catalyst (C) wherein the compound (B) has 10 mol % to less than 90 mol % of at least one structural unit (I)

$$-N(X-SiR''_x(OR')_{3-x})_n(X'-SiR''_y(OR')_{3-y})_m \quad (I)$$

Where R'=hydrogen, alkyl or cycloalkyl, X, X'=linear and/or branched alkylene or cycloalkylene radical having 1 to 20 carbon atoms, R''=alkyl, cycloalkyl, aryl or aralkyl, n=0 to 2, m=0 to 2, m+n=2, and x, y=0 to 2, and more than 10 to 90 mol % of at least one structural unit (II) $-Z-(X-SiR''_x(OR')_{3-x}$ (II), where $Z=-NH-$, $-NR-$, $-O-$ or $-S-$, where R=alkyl, cycloalkyl, aryl or aralkyl, and x, X, R' and R'' have the definition indicated for formula (I).

20 Claims, No Drawings

(56) References Cited

FOREIGN PATENT DOCUMENTS

| | | |
|---|---|---|
| EP | 0249201 A2 | 12/1987 |
| EP | 0276501 A2 | 8/1988 |
| EP | 0455211 B1 | 4/1995 |
| EP | 0707608 B1 | 2/1998 |
| EP | 0949284 A1 | 10/1999 |
| EP | 0994117 A1 | 4/2000 |
| EP | 0692007 B1 | 12/2001 |
| EP | 1273640 A2 | 1/2003 |
| EP | 0872499 B1 | 10/2004 |
| JP | 2002-105396 | 4/2002 |
| JP | 2007-002048 | 1/2007 |
| WO | W09422968 A1 | 10/1994 |
| WO | W09712945 A1 | 4/1997 |
| WO | WO2006042585 A1 | 4/2006 |
| WO | WO2008074489 A1 | 6/2008 |
| WO | WO2008074490 A1 | 6/2008 |
| WO | WO2008074491 A1 | 6/2008 |
| WO | WO2009077180 A1 | 6/2009 |
| WO | WO 2009/077180 * | 6/2009 ............. C08G 18/18 |

OTHER PUBLICATIONS

Römpp Lexikon "Lacke and Druckfarben," Georg Thieme Verlag, Stuttgart, 1998, pp. 250 to 252.

B. Singh, P.S. Forgione, J.a. Sedlak, L. Anderson, "Carbamylmethylated Melamines, Novel Crosslinkers for the Coatings Industry", Advanced Organic Coatings Science and Technology Series, 1991, pp. 193 to 207, vol. 13, Stamford, CT.

English Translation of International Search Report for International Application No. PCT/EP2012/050096 mailed Apr. 25, 2012, 3 pages.

Written Opinion for International Application No. PCT/EP2012/050096 mailed Ap. 25, 2012, 9 pages.

* cited by examiner

US 9,777,190 B2

AQUEOUS POLYURETHANE COATING MATERIAL AND COATINGS PRODUCED THEREFROM AND HAVING HIGH SCRATCH RESISTANCE AND GOOD CHEMICALS RESISTANCE

CROSS REFERENCE TO RELATED APPLICATIONS

This application is a National Phase Application of Patent Application PCT/EP2012/050096 filed on 4 Jan. 2012, which claims priority to U.S. 61/434,485, filed 20 Jan. 2011 and EP 11151559.9 filed 20 Jan. 2011, of which all aforementioned applications are incorporated by reference herein in their entirety.

BACKGROUND OF THE INVENTION

The present invention relates to aqueous, thermally curable polyurethane coating compositions comprising at least one hydroxyl-containing compound (A), at least one compound (B) having free and/or blocked isocyanate groups and also having hydrolyzable silane groups, and at least one catalyst (C) for the crosslinking of silane groups, these compositions exhibiting good storage stability and producing coatings with high scratch resistance in conjunction with good chemical resistance.

EP-A-1 273 640 describes nonaqueous 2K (two-component) coating compositions composed of a polyol component and a crosslinker component composed of aliphatic and/or cycloaliphatic polyisocyanates, where 0.1 to 95 mol % of the free isocyanate groups originally present have been reacted with bisalkoxylsilylamine. These coating compositions can be used for OEM production-line finishing and, after they have cured completely, exhibit good scratch resistance in conjunction with a high level of resistance toward environmental influences.

WO 08/74491, WO 08/74490, and WO 08/74489 disclose 2K coating compositions comprising polyols (A), preferably hydroxyl-containing polyacrylate polyols and/or hydroxyl-containing polymethacrylate polyols, and polyisocyanates (B) in which some of the isocyanate groups have been reacted with a mixture of 2.5 to 97.5 mol % of monoalkoxysilylamine and 2.5 to 97.5 mol % of bisalkoxysilylamine. The total fraction of the isocyanate groups reacted with the monoalkoxysilylamines and bisalkoxysilylamines in the polyisocyanate compound (B) is between 5 and 95 mol %, preferably between 10 and 90 mol %, more preferably between 15 and 85 mol %.

These coating compositions, like the coating compositions known from EP-A-1 273 640, are formulated purely on a solvent basis. For reasons of the environment and economics, however, it is desirable to bring about, as far as possible, a reduction in the fraction of conventional solvents used in coating compositions. In the field of the coating of parts for installation in or on automobiles, in particular, and also in the automotive refinish segment, there is an increased desire for low-emission coating compositions.

Aqueous 2K polyurethane coating compositions are likewise long-established systems. Component (I), typically referred to as the mill-base, has an aqueous formulation and comprises the constituents that are insensitive to water, more particularly the hydroxyl-containing compound (A). Component (II) comprises the isocyanate-group-containing compound (B) and also, optionally, further compounds that are sensitive to water.

Also known, furthermore, from EP-B-707 608, for example, are aqueous 2K polyurethane coating compositions where the hydroxyl-containing binder may optionally further comprise alkoxysilane groups. A key factor governing the coating compositions described therein is that at least one vinyl ester of alpha-branched monocarboxylic acids, or the reaction product of (meth)acrylic acid with the glycidyl ester of an alpha-branched monocarboxylic acid, is used as a synthesis component for the hydroxyl-group-containing binders.

DE-C-196 24 972 describes aqueous dispersions of silane-functional polyurethane resins and the use thereof as hydroxyl-containing binder in aqueous 2K polyurethane coating compositions. The coating compositions described therein exhibit high run stability and freedom from bubbles, and give coatings having good chemical resistance, gasoline resistance, and wet room resistance.

A problem affecting these aqueous coating compositions, however, is always the silane fraction present in the aqueous dispersion, since there is a risk of gelling and, consequently, an inadequate storage stability. In order to prevent gelling and to achieve adequate storage stability, it is necessary to limit the silane fraction in these systems, and this in turn results in a limited scratch resistance on the part of the resultant coatings.

EP-B-872 499, finally, discloses aqueous polyurethane coating compositions which in addition to a hydroxyl-containing compound comprise, as crosslinking agents, polyisocyanates in which 0.8 to 50 mol %, preferably 1.5 to 20 mol %, of the isocyanate groups have been reacted with monoalkoxysilylamines. The coating compositions described therein are notable for improved water resistance on the part of the resulting coatings as compared with aqueous polyurethane coating compositions based on non-silanized polyisocyanates.

A problem addressed by the present invention was that of providing low-emission coating compositions, more particularly clearcoats, which can be processed using the application methods customary for automotive OEM finishing and can be crosslinked at relatively low temperatures, thus allowing them to be used not only in OEM finishes but also in automotive refinishes. The coating composition is intended above all to meet the automakers' requirements of a high surface quality (gloss, leveling) and very good scratch resistance (high gloss retention after scratch exposure) in conjunction with good Erichsen cupping of more than 8.0 mm (average from at least 6 measurements) and also high resistance to chemical agents, especially aqueous sodium hydroxide solution.

Both the binder component and the crosslinker component, ought to have a high storage stability, and the coating composition, after mixing of the binder component and the crosslinker component, ought to have a sufficiently long processing life (potlife).

The coating compositions ought, furthermore, to meet the requirements typically imposed on the clearcoat film in automotive OEM finishes and automotive refinishes. Lastly, the new coating compositions ought to be able to be produced easily and very reproducibly, and ought not to cause any environmental problems during application of the coating material.

SUMMARY OF THE INVENTION

In light of the problems set out above, coating compositions have been found which comprise at least one hydroxyl-containing compound (A), at least one compound (B) having free and/or blocked isocyanate groups and also having hydrolyzable silane groups, and at least one catalyst (C) for the crosslinking of silane groups, wherein the compound (B) has 10 mol % to less than 90 mol %, based on the entirety of the structural units (I) and (II), of at least one structural unit of the formula (I)

$$—N(X—SiR''_x(OR')_{3-x})_n(X'—SiR''_y(OR')_{3-y})_m \quad (I)$$

where
R'=hydrogen, alkyl or cycloalkyl, it being possible for the carbon chain to be interrupted by nonadjacent oxygen, sulfur or NRa groups, where Ra=alkyl, cycloalkyl, aryl or aralkyl, preferably R'=ethyl and/or methyl,
X, X'=linear and/or branched alkylene or cycloalkylene radical having 1 to 20 carbon atoms, preferably X, X'=alkylene radical having 1 to 4 carbon atoms,
R''=alkyl, cycloalkyl, aryl or aralkyl, it being possible for the carbon chain for to be interrupted by nonadjacent oxygen, sulfur or NRa groups, where Ra=alkyl, cycloalkyl, aryl or aralkyl, preferably R''=alkyl, more particularly having 1 to 6 C atoms
n=0 to 2, m=0 to 2, m+n=2, and
x, y=0 to 2,
and
more than 10 mol % to 90 mol %, based on the entirety of the structural units (I) and (II), of at least one structural unit of the formula (II)

$$—Z—(X—SiR''_x(OR')_{3-x}) \quad (II),$$

where
Z=—NH—, —NR—, —O— or —S—, preferably —NH— or —NR—,
where
R=alkyl, cycloalkyl, aryl or aralkyl, it being possible for the carbon chain to be interrupted by nonadjacent oxygen, sulfur or NRa groups, where Ra=alkyl, cycloalkyl, aryl or aralkyl,
x=0 to 2, and
X, R' and R'' have the definition indicated for formula (I).

In light of the prior art it was surprising and unforeseeable for the skilled person that the problems addressed by the present invention could be solved with the aid of the coating composition of the invention.

The coating compositions of the invention afford new coatings and finishes, especially clearcoat finishes, which are highly scratch-resistant (high gloss retention after scratch exposure) and which, in contrast to common, highly crosslinked scratch-resistant systems, exhibit high resistance to chemical agents, more particularly to aqueous sodium hydroxide solution, in conjunction with good Erichsen cupping of more than 8.0 mm (average from at least 6 measurements). Besides this, the coating compositions exhibit good leveling and lead to coatings having a high surface quality (gloss).

The coatings and finishes of the invention, more particularly the clearcoat finishes, can be employed, accordingly, in the technologically and esthetically particularly demanding field of automotive OEM finishing. In this context they are also suitable in particular for the coating of parts for installation in or on automobiles, and may likewise be employed in the automotive refinish segment.

The components of the invention can be prepared in a particularly simple and very reproducible way, and they exhibit outstanding storage stability and, after the binder component and the crosslinker component have been mixed, they have a sufficiently long processing life (potlife). Moreover, they cause no significant toxicological or environmental problems during application of the coating material.

DETAILED DESCRIPTION OF THE INVENTION

In accordance with the invention it is possible to provide coating compositions which are highly scratch-resistant (high gloss retention after scratch) and which, in contrast, of common, highly crosslinked scratch-resistant systems, also have high resistance of the coatings to chemical agents, more particularly to aqueous sodium hydroxide solution, in conjunction with good Erichsen cupping of more than 8.0 mm (average from at least 6 measurements). At least to some extent, the coating compositions of the invention are formulated on an aqueous basis and therefore meet the increased desire for reduction in the solvents used. In these contexts they are especially suitable also for the coating of parts for installation in or on automobiles, and can likewise be employed in the automotive refinish segment.

The Hydroxyl-Containing Compound (A)

As hydroxyl-containing compound (A) it is preferred to employ not only low molecular mass polyols but also oligomeric and/or polymeric polyols.

Low molecular mass polyols used are, for example, diols, such as, preferably, ethylene glycol, neopentyl glycol, 1,2-propanediol, 2,2-dimethyl-1,3-propanediol, 1,4-butanediol, 1,3-butanediol, 1,5-pentanediol, 2,2,4-trimethyl-1,3-pentanediol, 1,6-hexanediol, 1,4-cyclohexanedimethanol and 1,2-cyclohexanedimethanol, and also polyols, such as, preferably, trimethylolethane, trimethylolpropane, trimethylolhexane, 1,2,4-butanetriol, pentaerythritol, and dipentaerythritol.

Low molecular mass polyols of this kind are admixed preferably in minor fractions to the oligomeric and/or polymeric polyol component (A).

The preferred oligomeric and/or polymeric polyols (A) have mass-average molecular weights Mw>500 daltons, as measured by means of GPC (gel permeation chromatography), preferably between 800 and 100 000 daltons, more particularly between 1000 and 50 000 daltons.

The glass transition temperatures, as measured by DSC (differential scanning calorimetry), of the polyols (A) are preferably between −150 and 100° C., more preferably between −120° C. and 80° C.

Additionally preferred are oligomeric and/or polymeric polyols (A) which have an OH number of 30 to 400 mgKOH/g, preferably 100 to 300 mgKOH/g.

The hydroxyl number (OH number) indicates the number of mg of potassium hydroxide that are equivalent to the amount of acetic acid bound by 1 g of substance on acetylation. For the determination, the sample is boiled with acetic anhydride-pyridine and the resulting acid is titrated with potassium hydroxide solution (DIN 53240-2).

Through the selection of the hydroxyl-containing binders as well it is possible to influence the properties of the cured-to-completion coating. Generally speaking, indeed, with increasing OH number of component (A), it is possible to lower the degree of silanization, i.e., the amount of structural units of the formulae (I) and (II), and this in turn has a positive influence on the weathering resistance of the cured-to-completion coating.

Use is made more particularly of hydroxyl-containing compounds (A) which are water-dilutable. The hydroxyl-containing compounds (A) therefore preferably have an amount of hydrophilic groups which brings about their solubility and/or dispersibility in water.

The hydroxyl-containing compounds (A) may therefore have ionic groups, groups capable of forming ions, and/or hydrophilic, nonionic groups. Groups capable of forming ions are functional groups, such as acidic or basic groups, which through neutralization with bases or acids are converted into ionic groups.

Basic groups contemplated that can be converted into cations include, for example, primary, secondary and tertiary amino groups, and cationic groups contemplated include quaternary ammonium, phosphonium, and sulfonium groups.

Preference is given to anionic groups or groups capable of forming anions. Examples of acidic groups capable of forming anions that are contemplated include carboxyl groups, phosphoric acid groups, phosphonic acid groups, and sulfonic acid groups. Preference is given to carboxyl groups, phosphonic acid groups and/or sulfonic acid groups. It is therefore preferred to use hydroxyl-containing compounds (A) having an acid number of 30 to 1, more preferably of 20 to 5 mg KOH/g.

The acid number here indicates the number of mg of potassium hydroxide which are consumed in neutralizing 1 g of the respective compound of component (A) (DIN EN ISO 2114).

Particularly preferred hydroxyl-containing compounds (A) are polyester polyols, polyurethane polyols, and more particularly polyacrylate polyols and/or polymethacrylate polyols, and also their copolymers, referred to below as polyacrylate polyols.

Suitable polyester polyols are described in, for example, EP-A-0 994 117 and EP-A-1 273 640. Polyurethane polyols are prepared preferably by reaction of polyester polyol prepolymers with suitable di- or polyisocyanates and are described in, for example, EP-A-1 273 640.

The polyacrylate polyols that are especially preferred in accordance with the invention are generally copolymers and preferably have mass-average molecular weights Mw of between 1000 and 20 000 daltons, more particularly between 1500 and 10 000 daltons, in each case as measured by means of gel permeation chromatography (GPC) against a polystyrene standard. The glass transition temperature of the copolymers is generally between −100 and 100° C., more particularly between −50 and 80° C. (measured by means of DSC measurements).

The polyacrylate polyols (A) preferably have an OH number of 60 to 250 mg KOH/g, more particularly between 70 and 200 mgKOH/g.

It is particularly preferred to use polyacrylate polyols (A) having an acid number of between 20 and 5 mg KOH/g.

As hydroxyl-containing monomer units it is preferred to use hydroxyalkyl acrylates and/or hydroxyalkyl methacrylates, such as, more particularly, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, and also, in particular, 4-hydroxybutyl acrylate and/or 4-hydroxybutyl methacrylate.

The carboxyl groups are introduced preferably by using ethylenically unsaturated carboxylic acids as monomer units, such as, for example, acrylic and/or methacrylic acid, ethacrylic acid, crotonic acid and/or vinylphosphonic acid, and the like, more particularly acrylic and/or methacrylic acid and/or vinylphosphonic acid.

As further monomer units for the polyacrylate polyols it is preferred to use alkyl acrylates and/or alkyl methacrylates, such as, preferably, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cycloalkyl acrylates and/or cycloalkyl methacrylates, such as cyclopentyl acrylate, cyclopentyl methacrylate, isobornyl acrylate, isobornyl methacrylate or, in particular, cyclohexyl acrylate and/or cyclohexyl methacrylate.

As further monomer units for the polyacrylate polyols it is possible to use vinylaromatic hydrocarbons, such as vinyltoluene, alpha-methylstyrene or, in particular styrene, amides or nitriles of acrylic or methacrylic acid, vinyl esters or vinyl ethers.

The hydroxyl-containing compounds (A) used with preference in accordance with the invention are obtainable by preparing, in an organic solvent or solvent mixture and preferably in the presence of a polymerization initiator and/or suitable catalyst, a hydroxyl-group-containing and acid-group-containing oligomer and/or polymer and subjecting the resultant hydroxyl- and acid-group-containing compound to partial neutralization, and dispersing it in water.

The particular degree of neutralization to be set is dependent on the acid number of the compound (A) and is situated in general between 50% and 90% for acid numbers <70 mg KOH/g and at between 30% and 80% for acid numbers >70 mgKOH/g. For the neutralization it is possible to use both organic and inorganic bases. Preference is given to using primary, secondary and/or tertiary amines, such as, for example, ethylamine, propylamine, dimethylamine, dibutylamine, cyclohexylamine, benzylamine, morpholine, piperidine, diethanolamine and triethanolamine, more particularly tertiary amines, very preferably dimethylethanolamine, triethylamine and dimethylisopropylamine, tripropylamine and tributylamine.

The neutralization reaction is carried out in general by mixing the neutralizing base with the solution of the hydroxyl- and acid-group-containing compound (A). The amount of base used here is generally sufficient for the resultant dispersion to have a pH of 6 to 9, preferably 7 to 8. Subsequently, the partially or fully neutralized polymer is dispersed by addition of water. This produces an aqueous dispersion of the hydroxyl-containing compound (A). Subsequently, if desired, some or all of the organic solvent can be removed by distillation.

The Isocyanate-Group-Containing Compound (B) with Hydrolyzable Silane Groups

The coating compositions of the invention comprise one or more compounds (B) having free, i.e., nonblocked, and/or blocked isocyanate groups and having hydrolyzable silane groups. The coating compositions of the invention preferably comprise compounds (B) having free isocyanate groups. The isocyanate groups of the isocyanate-group-containing compounds (B), however, may also be used in blocked form.

The diisocyanates and polyisocyanates (PI) that serve as parent structures for the compounds (B) used in accordance with the invention and comprising isocyanate groups and hydrolyzable silane groups are preferably conventional substituted or unsubstituted aromatic, aliphatic, cycloaliphatic and/or heterocyclic polyisocyanates.

Examples of preferred polyisocyanates (PI) are as follows: 2,4-toluene diisocyanate, 2,6-toluene diisocyanate, diphenyl methane 4,4'-diisocyanate, diphenylmethane 2,4'-diisocyanate, p-phenylene diisocyanate, biphenyl diisocyanates, 3,3'-dimethyl-4,4'-diphenylene diisocyanate, tetramethylene 1,4-diisocyanate, hexamethylene 1,6-diisocyanate, 2,2,4-trimethylhexane 1,6-diisocyanate, isophorone diisocyanate, ethylene diisocyanate, 1,12-dodecane diisocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenylmethane 2,4'-diisocyanate, 4,4'-methylenedicyclohexyl diisocyanate (e.g., Desmodur® W from Bayer AG), tetramethylxylyl diisocyanates (e.g., TMXDI® from American Cyanamid), and mixtures of the aforementioned polyisocyanates. Additionally preferred polyisocyanates (PI) are the biuret dimers and the isocyanurate trimers of the aforementioned diisocyanates.

Particularly preferred polyisocyanates (PI) are hexamethylene 1,6-diisocyanate, isophorone diisocyanate, and 4,4'-methylenedicyclohexyl diisocyanate, their biuret dimers and/or isocyanurate trimers.

In another embodiment of the invention the polyisocyanates (PI) are polyisocyanate prepolymers with urethane structural units, which are obtained by reaction of polyols with a stoichiometric excess of aforementioned polyisocyanates. Polyisocyanate prepolymers of this kind are described in, for example, U.S. Pat. No. 4,598,131.

The compounds (B) used in accordance with the invention and comprising isocyanate groups and hydrolyzable silane groups may be hydrophilically modified. The compounds (B) may therefore have hydrophilic groups, examples being ionic groups, groups capable of forming ions, and/or hydrophilic, nonionic groups. Groups capable of forming ions are functional groups, such as acidic or basic groups, which through neutralization with bases or acids are converted into ionic groups.

Preferred hydrophilic groups are polyether groups and/or groups capable of forming anions. Examples of acidic groups contemplated that are capable of forming anions include carboxyl groups, phosphoric acid groups, phosphonic acid groups, and sulfonic acid groups. Preference is generally given to sulfonic acid groups, since in terms of dispersibility they are the most effective.

As an example of compounds (B) having hydrophilic, nonionic groups, mention may be made, for example, of those based on diisocyanates and/or polyisocyanates (PI) which at least partly contain polyether chains with incorporated ethylene oxide units or incorporated propylene oxide units.

Hydrophilically modified diisocyanates and/or polyisocyanates (PI) are known. In commerce, hydrophilically modified diisocyanates and/or polyisocyanates are available, for example, under the designation Bayhydur®, examples being Bayhydur® 304, Bayhydur® 305, Bayhydur® 3100, Bayhydur® 401-70, and Bayhydur® BL5140 from Bayer Material Science AG, and under the designation Basonat®, examples being Basonat®HW100 and Basonat® HW180PC, from BASF SE.

It is essential to the invention that the isocyanate-group-containing compounds (B) have 10 mol % to less than 90 mol %, based on the entirety of the structural units (I) and (II), of at least one structural unit of the formula (I)

—N(X—SiR"$_x$(OR')$_{3-x}$)$_n$(X'—SiR"$_y$(OR')$_{3-y}$)$_m$ (I)

where

R'=hydrogen, alkyl or cycloalkyl, it being possible for the carbon chain to be interrupted by nonadjacent oxygen, sulfur or NRa groups, where Ra=alkyl, cycloalkyl, aryl or aralkyl, preferably R'=ethyl and/or methyl, X, X'=linear and/or branched alkylene or cycloalkylene radical having 1 to 20 carbon atoms, preferably X, X'=alkylene radical having 1 to 4 carbon atoms, R"=alkyl, cycloalkyl, aryl or aralkyl, it being possible for the carbon chain to be interrupted by nonadjacent oxygen, sulfur or NRa groups, where Ra=alkyl, cycloalkyl, aryl or aralkyl, preferably R"=alkyl, more particularly having 1 to 6 C atoms n=0 to 2, m=0 to 2, m+n=2, and x, y=0 to 2, and more than 10 mol % to 90 mol %, based on the entirety of the structural units (I) and (II), of at least one structural unit of the formula (II)

—Z—(X—SiR"$_x$(OR')$_{3-x}$) (II), where

Z=—NH—, —NR—, —O— or —S—, more particularly —NH— or —NR—, where

R=alkyl, cycloalkyl, aryl or aralkyl, it being possible for the carbon chain to be interrupted by nonadjacent oxygen, sulfur or NRa groups, where Ra=alkyl, cycloalkyl, aryl or aralkyl, x=0 to 2, and X, R' and R" have the definition indicated for formula (I).

Particularly preferred are coating compositions in which the compound (B) has between 20 and 80 mol %, preferably between 30 and 70 mol %, more particularly between 40 and 60 mol %, based in each case on the entirety of the structural units (I) and (II), of at least one structural unit of the formula (I)

and between 20 and 80 mol %, preferably between 30 and 70 mol %, more particularly between 40 and 60 mol %, based in each case on the entirety of the structural units (I) and (II), of at least one structural unit of the formula (II).

Likewise particularly preferred are coating compositions in which, in the compound (B), the fraction of isocyanate groups that have been reacted to form the structural units (I) and (II) is between 10 and 60 mol %, preferably between 20 and 50 mol %, and more preferably more than 20 mol % to 40 mol %. A degree of silanization (that is, the fraction of the isocyanate groups that have undergone reaction to form the structural units (I) and (II)) of 10 mol % here means that 10 mol % of the isocyanate groups originally present have undergone reaction to form the structural units (I) and (II).

Structural units of the formula (I) may be introduced into the compound (B) by partial reaction of the isocyanate groups of the polyisocyanates (PI) with a compound of the formula (Ia)

HN(X—SiR"$_x$(OR')$_{3-x}$)$_n$(X'—SiR"$_y$(OR')$_{3-y}$)$_m$ (Ia), where the substituents have the definition stated above.

Structural units of the formula (II) may be introduced into the compound (B) by partial reaction of the isocyanate groups of the polyisocyanates (PI) with a compound of the formula (IIa)

H—Z—(X—SiR"$_x$(OR')$_{3-x}$) (IIa), where the substituents have the definition stated above.

The reaction of the polyisocyanates (PI) with the compounds (Ia) and (IIa) takes place preferably in an inert gas atmosphere at temperatures of not more than 100° C., preferably of not more than 60° C.

Inventionally preferred compounds (Ia) are bis(2-ethyltrimethoxysilyl)amine, bis(3-propyltrimethoxysilyl)amine, bis(4-butyltrimethoxysilyl)amine, bis(2-ethyltriethoxysilyl) amine, bis(3-propyltriethoxysilyl)amine and/or bis(4-butyltriethoxysilyl)amine. Especially preferred is bis(3-propyltrimethoxysilyl)amine. Aminosilanes of this kind are available, for example, under the brand name DYNASYLAN® from DEGUSSA or Silquest® from OSI. Inventionally preferred compounds (IIa) are omega-aminoalkyl- or omega-hydroxyalkyltrialkoxysilanes, such as, preferably, 2-aminoethyltrimethoxysilane, 2-aminoethyltriethoxysilane, 3-aminopropyltrimethoxysilane, 3-aminopropyltriethoxysilane, 4-aminobutyltrimethoxysilane, 4-aminobutyltriethoxysilane, 2-hydroxyethyltrimethoxysilane, 2-hydroxyethyltriethoxysilane, 3-hydroxypropyltrimethoxysilane, 3-hydroxypropyltriethoxysilane, 4-hydroxybutyltrimethoxysilane, and 4-hydroxybutyltriethoxysilane. Particularly preferred compounds (IIa) are N-(2-(trimethoxysilyl)ethyl)-alkylamines, N-(3-(trimethoxysilyl)propyl)alkylamines, N-(4-(trimethoxysilyl)butyl) alkylamines, N-(2-(triethoxysilyl)ethyl)alkylamines, N-(3-(triethoxysilyl)propyl)alkylamines and/or N-(4-(triethoxysilyl)butyl)alkylamines. Especially preferred is N-(3-(trimethoxysilyl)propyl)butylamine. Aminosilanes of this kind are available, for example, under the brand name DYNASYLAN® from DEGUSSA or Silquest® from OSI.

Generally speaking, for a given degree of silanization, an increase in the fraction of monofunctional silane (II) is accompanied by an increase in the resistance of the cured-to-completion coating with respect to aqueous sodium hydroxide solution, but at the same time the scratch resistance drops. Generally speaking, moreover, as the fraction of difunctional silane (I) goes up, there is a decrease in the resistance of the cured-to-completion coating with respect to aqueous sodium hydroxide solution, but at the same time the scratch resistance rises. With high fractions of difunctional silane, therefore, other measures must be taken in order to increase the resistance to chemicals, more particularly to aqueous sodium hydroxide solution, accordingly, in order to provide the coating compositions of the invention. In particular, the degree of silanization overall can be lowered—in other words, the fraction selected of isocyanate groups reacted overall with a silane can be correspondingly low.

Furthermore, as the degree of silanization increases (that is, the total fraction of isocyanate groups reacted with the compounds (Ia) and (IIa) increases) and the fraction of difunctional silane (Ia) increases, the influence of the catalyst on the properties of the resultant coating becomes ever greater, and so in that case, in particular, amine-blocked, phosphoric acid-based catalysts are employed.

It is also possible here for nonfunctional substituents on the organofunctional silane that is used for introducing the silane structural units to influence the reactivity of the hydrolyzable silane group. An illustrative example of this is that of voluminous, bulky substituents on the amine function, which may reduce the reactivity of amine-functional silanes. In light of this, N-(n-butyl)-3-aminopropyltrimethoxysilane is preferred over N-cyclohexyl-3-aminopropyltrimethoxysilane for the introduction of the silane structural units (II).

Very generally, the radicals which increase the reactivity of the silanes are preferred over radicals which lower the reactivity of the silanes.

Especially preferred compounds (B) containing isocyanate groups are reaction products of hexamethylene 1,6-diisocyanate and/or isophorone diisocyanate and/or 4,4'-methylenedicyclohexyl diisocyanate and/or their isocyanurate trimers with bis(3-propyltrimethoxysilyl) amine and N-(3-(trimethoxysilyl)propyl)butylamine.

The Catalyst (C) for the Crosslinking of the Silane Groups

As catalysts for the crosslinking of the alkoxysilyl units and also for the reaction between the hydroxyl groups of the compound (A) and the free isocyanate groups of the compound (B) it is possible to use compounds that are known per se. Examples are Lewis acids (electron-deficient compounds), such as, for example, tin naphthenate, tin benzoate, tin octoate, tin butyrate, dibutyltin dilaurate, dibutyltin diacetate, dibutyltin oxide, and lead octoate, and also catalysts as described in WO-A-2006/042585.

It is preferred, however, to use phosphorus-containing, more particularly phosphorus- and nitrogen-containing, catalysts as catalyst (C). In this context it is also possible to use mixtures of two or more different catalysts (C).

Examples of suitable phosphorus-containing catalysts (C) are substituted phosphonic diesters and diphosphonic diesters, preferably from the group consisting of acyclic phosphonic diesters, cyclic phosphonic diesters, acyclic diphosphonic diesters, and cyclic diphosphonic diesters.

Thus, for example, use may be made of acyclic phosphonic diesters of the general formula (V)

or cyclic phosphonic diesters of the general formula (VI)

In the general formula (V) and (VI), the radicals $R_{10}$ and $R_{11}$ are identical to or different from one another, preferably they are identical, and have the definition indicated later on below for formula (IV).

In the general formula (VI), the variable L' stands for
a covalent bond between an atom of the radical $R_{10}$ and an atom of the radical $R_{11}$;
a divalent linking group selected from the group consisting of oxygen atom, substituted, more particularly oxygen-substituted, and unsubstituted sulfur atom, substituted, more particularly alkyl-substituted, nitrogen atom, substituted, more particularly oxygen-substituted, phosphorus atom, and substituted, more particularly alkyl- and alkoxy-substituted, silicon atom, more particularly oxygen atom; or
a divalent linking group selected from the groups consisting of aryl having 5 to 10 and more particularly 6 carbon atoms, cycloalkyl having 3 to 10, preferably 3 to 6, and more particularly 6 carbon atoms, and alkyl having 1 to 10, preferably 1 to 6, and more particularly 1 to 4 carbon atoms, which is substituted or unsubstituted and comprises at least one heteroatom selected from the group consisting of oxygen atom, sulfur atom, nitrogen atom, phosphorus atom and silicon atom, more particularly oxygen atom, sulfur atom, and nitrogen atom, or is free from heteroatoms.

Furthermore it is also possible, for example, to use acyclic diphosphonic diesters (C) of the general formula (VII):

$(R_{10}-O)(O)PH-O-PH(O)(O-R_{11})$   (VII);

in which the variables have the definition indicated above. Catalysts of this kind are described in, for example, German patent application DE-A-102005045228.

Use is made more particularly, however, of substituted phosphoric monoesters and phosphoric diesters, preferably from the group consisting of acyclic phosphoric diesters and cyclic phosphoric diesters, more preferably amine adducts of phosphoric monoesters and diesters. The acyclic phosphoric diesters (C) here are selected more particularly from the group consisting of acyclic phosphoric diesters (C) of the general formula (IV):

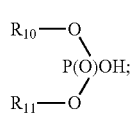

(IV)

where the radicals $R_{10}$ and $R_{11}$ are selected from the group consisting of the following:
  substituted and unsubstituted alkyl having 1 to 20, preferably 2 to 16, and more particularly 2 to 10 carbon atoms, cycloalkyl having 3 to 20, preferably 3 to 16, and more particularly 3 to 10 carbon atoms, and aryl having 5 to 20, preferably 6 to 14, and more particularly 6 to 10 carbon atoms,
  substituted and unsubstituted alkylaryl, arylalkyl, alkylcycloalkyl, cycloalkylalkyl, arylcycloalkyl, cycloalkylaryl, alkylcycloalkylaryl, alkylarylcycloalkyl, arylcycloalkylalkyl, arylalkylcycloalkyl, cycloalkylalkylaryl, and cycloalkylarylalkyl, the alkyl, cycloalkyl, and aryl groups present therein each containing the above-recited number of carbon atoms, and
  substituted and unsubstituted radical of the type recited above, comprising at least one, more particularly one, heteroatom selected from the group consisting of oxygen atom, sulfur atom, nitrogen atom, phosphorus atom, and silicon atom, more particularly oxygen atom, sulfur atom, and nitrogen atom and additionally may also represent hydrogen (partial esterification).

Very particular preference is given to using as catalyst (C) the corresponding amine-blocked phosphoric esters, and here more particularly amine-blocked phosphoric acid ethylhexyl esters and amine-blocked phosphoric acid phenyl esters, especially amine-blocked bis(2-ethylhexyl)phosphate.

Examples of amines with which the phosphoric esters are blocked are more particularly tertiary amines, an example being triethylamine. Particular preference for the blocking of the phosphoric esters is given to the use of tertiary amines which ensure good activity of the catalyst under the particular curing conditions. Especially when the coating compositions are used in the refinish segment or for the coating of plastics, such as parts for installation in or on automobile bodywork, it is preferred as catalyst (C) to use a phosphoric acid compound, more particularly phosphoric acid or phosphonic acid, which is blocked with amine having a pKb>3 and a boiling point >100° C. Examples of such preferred amines with which the phosphoric esters are blocked are, in addition to diazabicyclooctane (DABCO), for example, N-dimethyl-benzylamine and N-methylmorpholine. The determination of the pKb is described in WO 09/077,180, page 34, line 1, to page 38, line 9.

Certain amine-blocked phosphoric acid catalysts are also available commercially (e.g., Nacure products from King Industries). As a particularly suitable catalyst, for example, mention may be made of the catalyst based on an amine-blocked phosphoric acid partial ester under the designation Nacure 4167 from King Industries.

The catalysts are used preferably in fractions of 0.01 to 20% by weight, more preferably in fractions of 0.1 to 10% by weight, based on the nonvolatile constituents of the coating composition of the invention. A lower activity on the part of the catalyst may be compensated in part by correspondingly higher quantities employed.

The Combination of Components A and B and Also Further Components of the Coating Composition The weight fraction of the hydroxyl-containing compounds A to be used, based on the weight fraction of the isocyanate-group-containing compounds B, is dependent on the hydroxy equivalent weight of the polyol and on the equivalent weight of the free isocyanate groups of the polyisocyanate B.

The coating compositions of the invention contain preferably between 2.5% and 97.5% by weight, more preferably between 5% and 95% by weight, very preferably between 10% and 90% by weight, more particularly between 20% and 80% by weight, based on the amount of nonvolatile substances in the coating composition, of the hydroxyl-containing compounds (A), and preferably between 2.5% and 97.5% by weight, more preferably between 5% and 95% by weight, very preferably between 10% and 90% by weight, more particularly between 20% and 80% by weight, based on the amount of nonvolatile substances in the coating composition, of the isocyanate-group-containing compounds (B).

In order to ensure further-improved resistances on the part of the coatings of the invention with respect to cracking under UV radiation and wet/dry cycling in the CAM180 test (according to DIN EN ISO 11341 February 98 and DIN EN ISO 4892-2 November 00) in combination with high scratch resistance directly after thermal curing to completion, with a high gloss, and with a high gloss retention after weathering, it is preferred, moreover, to select the amount of structural units (I) and/or (II) and/or (III) at a level at most such that the coating compositions of the invention contain less than 6.5% by mass of Si of the structural units (I) and/or (II) and/or (III), very preferably not more than 6.0% by mass of Si of the structural units (I) and/or (II) and/or (III), in each case based on the solids content of the coating compositions. The silane content in % by masse of Si is determined arithmetically from the amounts of the compounds with the structural unit (I) and of the compounds (IIa) and/or (IIIa) that are used.

The weight fractions of the polyol A and of the polyisocyanate B are preferably selected such that the molar equivalents ratio of the unreacted isocyanate groups of the isocyanate-containing compounds (B) to the hydroxyl groups of the hydroxyl-containing compounds (A) is between 0.7:1 and 1.3:1, preferably between 0.9:1 and 1.1:1, more preferably between 0.95:1 and 1.05:1.

In the case of two-component or multicomponent coating compositions of the invention, shortly before the coating composition is applied,
component (I), comprising the hydroxyl-containing compound (A) and also, if desired, further components, described below,
is mixed conventionally with
component (II), comprising the isocyanate-group-containing compound (B), the catalyst (C), optionally organic solvents, and optionally further of the components described below, and optionally with a further component (III), comprising further of the components described below.

Especially preferred two-component or multicomponent coating compositions are those in which component (II) is substantially water-free. Substantially water-free here means that component (II) contains less than 1.0% by weight of water, based on the weight of the isocyanate-group-containing compound (B). More particularly, component (II) contains no water at all.

Accordingly, preferred two-component or multicomponent coating compositions are those in which component (I) and/or component (III) comprise water.

Three-component coating compositions, in addition to the above-described, substantially water-free component (II), have alternatively a likewise substantially water-free component (I) and a water-containing component (III), or a likewise substantially water-free component (III) and a water-containing component (I), or both a water-containing component (I) and a water-containing component (III).

Three-component coating compositions are generally used in order to adjust high-solids systems to processing viscosity in situ.

Component (II), comprising the isocyanate-group-containing compound (B), typically further comprises organic solvent. The solvent content of component (II) here is typically from 0% to 60% by weight, preferably from 20% to 50% by weight, based in each case on the weight of the isocyanate-group-containing compound (B).

Furthermore, the other components as well, more particularly component (I) and/or (III), may further comprise organic solvent. Preference in accordance with the invention is given to coating compositions in which the total fraction of organic solvent is between 0% and 40% by weight, more particularly between 10% and 30% by weight, based in each case on the total weight of the coating composition. Preferably, furthermore, the total fraction of water is between 10% and 60% by weight, more particularly between 15% and 55% by weight, based in each case on the total weight of the coating composition. Likewise with preference the nonvolatile fraction of the coating composition is between 20% and 70% by weight, preferably between 30% and 60% by weight.

Organic solvent suitable for component (I) and/or (II) and/or (III) according to the invention is more particularly those solvents which in the coating composition are chemically inert with respect to the compounds (A) and/or (B) and which also do not react with (A) and (B) in the course of the curing of the coating composition. The solvents ought preferably to be miscible with water.

Examples of such solvents are aliphatic and/or aromatic hydrocarbons such as toluene, xylene, solvent naphtha, Solvesso 100 or Hydrosol® (from ARAL), ketones, such as acetone, methyl ethyl ketone or methyl amyl ketone, esters, such as ethyl acetate, butyl acetate, pentyl acetate or ethyl ethoxypropionate, ethers, or mixtures of the aforementioned solvents.

Besides the compounds (A), (B), and (C) it is possible additionally to use further binders (E), which preferably are able to react and form network points with the hydroxyl groups of the compound (A) and/or with the free isocyanate groups of the compound (B) and/or with the alkoxysilyl groups of the compound (B). Depending on their reactivity, the binders (E) used may be present in component (I) or (II).

By way of example it is possible to use amino resins and/or epoxy resins as component (E). Suitable amino resins are the typical, known amino resins, some of whose methylol and/or methoxymethyl groups may have been defunctionalized by means of carbamate or allophanate groups. Crosslinking agents of this kind are described in patents U.S. Pat. No. 4,710,542 and EP-B-0 245 700 and also in the article by B. Singh and coworkers, "Carbamylmethylated Melamines, Novel Crosslinkers for the Coatings Industry" in Advanced Organic Coatings Science and Technology Series, 1991, volume 13, pages 193 to 207.

In general such components (E) are used in fractions of up to 40%, preferably of up to 30%, more preferably of up to 25%, by weight, based on the nonvolatile constituents of the coating composition.

The coating composition of the invention may further comprise at least one typical, known coatings additive in effective amounts, i.e., in amounts preferably up to 30%, more preferably up to 25%, and in particular up to 20%, by weight, based in each case on the nonvolatile constituents of the coating composition.

Examples of suitable coatings additives are as follows:

particularly UV absorbers;

particularly light stabilizers such as HALS compounds, benzotriazoles or oxalanilides;

free-radical scavengers;

slip additives;

polymerization inhibitors;

defoamers;

reactive diluents, of the kind which are common knowledge from the prior art, and which are preferably inert toward the —Si(OR)3 groups;

wetting agents such as siloxanes, fluorine compounds, carboxylic monoesters, phosphoric esters, polyacrylic acids and their copolymers, or polyurethanes;

adhesion promoters such as tricyclodecanedimethanol;

flow control agents;

film-forming assistants such as cellulose derivatives;

fillers such as, for example, nanoparticles based on silicon dioxide, aluminum oxide or zirconium oxide; for further details refer to Römpp Lexikon "Lacke and Druckfarben" Georg Thieme Verlag, Stuttgart, 1998, pages 250 to 252;

rheology control additives, such as the additives known from patents WO 94/22968, EP-A-0 276 501, EP-A-0 249 201 or WO 97/12945; crosslinked polymeric microparticles, as disclosed for example in EP-A-0 008 127; inorganic phyllosilicates such as aluminum-magnesium silicates, sodium-magnesium, and sodium-magnesium-fluorine-lithium phyllosilicates of the montmorillonite type; silicas such as Aerosils; or synthetic polymers containing ionic and/or associative groups such as polyvinyl alcohol, poly(meth)acrylamide, poly(meth)acrylic acid, polyvinylpyrrolidone, styrene-maleic anhydride copolymers or ethylene-maleic anhydride copolymers and their derivatives, or hydrophobically modified ethoxylated urethanes or polyacrylates;

and/or flame retardants.

In a further embodiment of the invention the coating composition of the invention may additionally comprise further pigments and/or fillers and may serve for producing pigmented topcoats. The pigments and/or fillers employed for this purpose are known to the skilled person.

Because the coatings of the invention produced from the coating compositions of the invention adhere excellently even to electrocoats, surfacer coats, basecoat systems or typical, known clearcoat systems that have already cured, they are outstandingly suitable not only for use in automotive OEM (production line) finishing but also for automotive refinish or for the modular scratchproofing of automobile bodies that have already been painted.

The coating compositions of the invention can be applied by any of the typical application methods, such as spraying, knife coating, spreading, pouring, dipping, impregnating, trickling or rolling, for example. In the course of such application, the substrate to be coated may itself be at rest, with the application equipment or unit being moved. Alternatively the substrate to be coated, in particular a coil, may be moved, with the application unit at rest relative to the substrate or being moved appropriately. Preference is given to employing spray application methods, such as compressed-air spraying, airless spraying, high-speed rotation, electrostatic spray application (ESTA), alone or in conjunction with hot spray application such as hot-air spraying, for example.

The applied coating compositions of the invention can be cured after a certain rest time. The rest time serves, for example, for the leveling and devolatilization of the coating films or for the evaporation of volatile constituents such as solvents. The rest time may be assisted and/or shortened by the application of elevated temperatures and/or by a reduced humidity, provided this does not entail any damage or alteration to the coating films, such as premature complete crosslinking, for instance.

The thermal curing of the coating compositions has no peculiarities in terms of method but instead takes place in accordance with the typical, known methods such as heating in a forced-air oven or irradiation with IR lamps. The thermal cure may also take place in stages. Another preferred curing method is that of curing with near infrared (NIR) radiation.

The thermal cure takes place advantageously at a temperature of 30 to 200° C., more preferably 40 to 190° C., and in particular 50 to 180° C. for a time of 1 min up to 10 h, more preferably 2 min up to 5 h, and in particular 3 min to 3 h, although longer cure times may be employed in the case of the temperatures that are used for automotive refinish, which are preferably between 30 and 90° C., and in the case of the temperatures employed for coating plastics parts for insulation, which are preferably between 50 and 90° C.

The coating compositions of the invention produce new cured coatings, especially coating systems, more particularly clearcoat systems, moldings, especially optical moldings, and self-supporting films, all of which are highly scratch resistant, and more particularly chemicals-stable and weathering-stable. In particular, the coatings and coating systems of the invention, especially the clearcoat systems, can be produced even in film thicknesses >40 μm without stress cracks occurring.

For these reasons the coating compositions of the invention are of excellent suitability as decorative, protective and/or effect-imparting, highly scratch resistant coatings and coating systems on bodies of means of transport (especially motor vehicles, such as motorcycles, buses, trucks or automobiles) or parts thereof; on buildings, for both interior and exterior; on furniture, windows, and doors; on plastics moldings, especially CDs and windows; on small industrial parts, on coils, containers, and packaging; on white goods; on films; on optical, electrical, and mechanical components; and on hollow glassware and articles of everyday use.

The coating compositions and coating systems of the invention, especially the clearcoat systems, are employed in particular in the technologically and esthetically particularly demanding field of automotive OEM (production line) finishing, especially for the coating of plastics parts for installation in and on automobile bodies, particularly for top-class automobile bodies, such as, for example, for the production of roofs, trunk lids, hoods, fenders, bumpers, spoilers, sills, trim strips, side trim, and the like, and also in automotive refinish.

The plastics parts are typically composed of ASA, polycarbonates, blends of ASA and polycarbonates, polypropylene, polymethyl methacrylates or impact-modified polymethyl methacrylates, more particularly of blends of ASA and polycarbonates, preferably with a polycarbonate fraction >40%, more particularly >50%.

By ASA is meant, generally, impact-modified styrene/acrylonitrile polymers, where graft copolymers of vinylaromatic compounds, more particularly styrene, and of vinyl cyanides, more particularly acrylonitrile, are present on polyalkyl acrylate rubbers in a copolymer matrix of styrene and acrylonitrile in particular.

With particular preference the coating compositions of the invention are used in multistage coating methods, more particularly in methods in which an uncoated or precoated substrate has applied to it first a pigmented basecoat film and thereafter a film with the coating compositions of the invention.

Not only water-thinnable basecoat materials but also basecoat materials based on organic solvents can be used. Suitable basecoat materials are described for example in EP-A-0 692 007 and in the documents cited there in column 3 lines 50 et seq. The applied basecoat material is preferably first dried, i.e., at least some of the organic solvent and/or water is stripped from the basecoat film in an evaporation phase. Drying is accomplished preferably at temperatures from room temperature to 80° C. Drying is followed by the application of the coating composition of the invention. Subsequently the two-coat system is baked, preferably under conditions employed for automotive OEM finishing, at temperatures from 30 to 200° C., more preferably 40 to 190° C., and in particular 50 to 180° C., for a time of 1 min up to 10 h, more preferably 2 min up to 5 h, and in particular 3 min to 3 h, although longer cure times may also be employed at the temperatures employed for automotive refinish and at the temperatures employed for coating installation parts, which are generally between 30 and 90° C.

The coats produced with the coating composition of the invention are notable in particular for an especially high chemicals resistance and weathering resistance and also for very good carwash resistance and scratch resistance, and more particularly for an outstanding combination of scratch resistance and weathering stability with respect to UV radiation in a wet/dry cycle.

In a further preferred embodiment of the invention, the coating composition of the invention is used as a transparent clearcoat material for coating plastics substrates, more particularly plastics parts for installation. These plastics parts are preferably likewise coated in a multistage coating process, in which a substrate which is uncoated or precoated, or a substrate which has been pretreated for improved adhesion of the subsequent coatings (by means, for example, of flame, corona or plasma treatment of the substrate), is coated first with a pigmented basecoat film and thereafter with a film comprising the coating composition of the invention.

Not only water-thinnable basecoats but also basecoats based on organic solvents can be used. Suitable basecoat materials are, for example, described in EP-A-0 692 007 and in the documents cited therein at column 3, lines 50 et seq. Suitable effect basecoat materials for the direct coating of unprimed plastics substrates comprising or consisting of polypropylene are described in EP-B-455 211, for example.

Furthermore, they may also be used for the coating of transparent plastics substrates. In this case, the coating compositions include UV absorbers which in terms of amount and type are also designed for the effective UV protection of the plastics substrate. Here again, the coating compositions are notable for an outstanding combination of scratch resistances and weathering stability with respect to UV radiation in a wet-dry cycle. The plastics substrates thus coated are employed preferably as a substitute for glass components in automobile construction, the plastics substrates being composed preferably of polymethyl methacrylate or polycarbonate.

EXAMPLES

Preparation of Inventive Component B

Preparation Example B1—Preparation of a Partly Silanized Polyisocyanate B1 Having a Degree of Silanization of 30 Mol % and a Bis-/Mono-Silane Ratio of 10 Mol % Bissilane to 90 Mol % Monosilane A three-neck glass flask equipped with a reflux condenser and a thermometer is charged with 54.4 parts of trimerized hexamethylene diisocyanate (HDI) (Desmodur® N3600, Bayer Material Science), 2.4 parts of triethyl orthoformate and 20.3 parts of butyl acetate. With nitrogen blanketing and stirring, a mixture of 4.1 parts of bis[3-(trimethoxysilyl)propyl]amine (Dynasylan® 1124, Degussa, Rheinfelden) and 18.5 parts of N-[3-(trimethoxysilyl)propyl]butylamine (Dynasylan® 1189, Degussa, Rheinfelden) is metered in at a rate such that 50° C. are not exceeded. After the end of the metered addition, the reaction temperature is held at 50° C. for 60 minutes. The degree of blocking is investigated by means of titration (NCO content=10.9% on nonvolatiles content).

The curing agent has a nonvolatiles content of 77% by weight.

Preparation Example B2—Preparation of a Partly Silanized Polyisocyanate B2 Having a Degree of Silanization of 30 Mol % and a Bis-/Mono-Silane Ratio of 50 Mol % Bissilane to 50 Mol % Monosilane A three-neck glass flask equipped with a reflux condenser and a thermometer is charged with 53.3 parts of trimerized hexamethylene diisocyanate (HDI) (Desmodur N3600, Bayer Material Science), 2.4 parts of triethyl orthoformate and 18.1 parts of butyl acetate. With nitrogen blanketing and stirring, a mixture of 16.1 parts of bis[3-(trimethoxysilyl)propyl]amine (Dynasylan 1124, Degussa, Rheinfelden) and 10.1 parts of N-[3-(trimethoxysilyl)propyl]butylamine (Dynasylan 1189, Degussa, Rheinfelden) is metered in at a rate such that 50° C. are not exceeded. After the end of the metered addition, the reaction temperature is held at 50° C. for 60 minutes. The degree of blocking is investigated by means of titration (NCO content=10.5% on NVC).

The curing agent has a nonvolatiles content of 79% by weight.

Preparation Example B3—Preparation of a Noninventive, Partly Silanized Polyisocyanate B3 Having a Degree of Silanization of 30 Mol % and a Bis-/Mono-Silane Ratio of 90 Mol % Bissilane to 10 Mol % Monosilane A three-neck glass flask equipped with a reflux condenser and a thermometer is charged with 52 parts of trimerized hexamethylene diisocyanate (Desmodur® N3600, Bayer Material Science), 2.4 parts of triethyl orthoformate and 18 parts of butyl acetate. With nitrogen blanketing and stirring, a mixture of 26.0 parts of bis[3-(trimethoxysilyl)propyl]amine (Dynasylan® 1124, Degussa, Rheinfelden) and 2.0 parts of N-[3-(trimethoxysilyl)propyl]butylamine (Dynasylan® 1189, Degussa, Rheinfelden) is metered in at a rate such that 50° C. are not exceeded. After the end of the metered addition, the reaction temperature is held at 50° C. for 60 minutes. The degree of blocking is investigated by means of titration (NCO content=10.4% on nonvolatiles content).

The curing agent has a nonvolatiles content of 80% by weight.

Preparation of the Millbase Component (I)

From the components indicated in table 1, the millbase component (I) is prepared by mixing of the individual components.

TABLE 1

Composition in parts by weight of the millbase component (I) for inventive examples 1 and 2 and for comparative example C1

| | |
|---|---|
| BAYHYDROL A 2470 [1] | 57.86 |
| BUTYL ACETATE 98-100% | 9.5 |
| SOLVENT NAPHTHA 160/180 | 9.5 |
| Flow control agent [2] | 1.2 |
| Defoamer 52% [3] | 0.2 |
| TINUVIN 384-2, 95% MPA [4] | 0.9 |
| TINUVIN 292 [5] | 0.8 |
| NACURE 4167 [6] | 1.9 |
| WATER, DI | 17.3 |

Key to table 1:
[1] commercial, 45%, aqueous secondary emulsion of a hydroxyl-containing polyacrylate polymer having an OH content of 3.9%, based on the solids content, an acid number of 24, based on the solids content, neutralized with triethanolamine, a Tg of 50° C., a pH of 7.8 for the emulsion, a viscosity of 2000 mPa · s at 23° C., and a propylene glycol butyl ether content of 4% and a Solventnaphta ® 100 content of 4%
[2] commercial flow control agent for aqueous systems, based on a dimethylpolysiloxane-modified polyether
[3] commercial defoamer, based on a 52% strength solution of a polymethylalkylsiloxane in alkylbenzenes
[4] commercial light stabilizer, based on a benzotriazole, from BASF SE, 95% in methoxypropyl acetate
[5] commercial light stabilizer, based on a sterically hindered amine, from BASF SE
[6] commercial catalyst, based on amine-blocked phosphoric partial ester, from King Industries, nonvolatiles content 25%

Preparation of the Coating Compositions of Examples 1 and 2 and of the Coating Composition of Comparative Example C1

For producing the coating compositions of examples 1 and 2 and the coating composition of comparative example C1, 100 parts by weight of the millbase component (I) according to table 1 were mixed in each case with 50 parts by weight of the respective curing component B1 (example 1) or B2 (example 2) or CB1 (comparative example C1) and stirred until the mixture was homogenous.

Production of the Coatings of Examples 1 and 2 and the Coating of Comparative Example C1

The coating compositions were combined intimately with one another in a suitable vessel and applied immediately thereafter to a metal mirror plate coated with black basecoat (basecoat drying 30 min at 80° C., 10 min flash-off time). The plates are subsequently dried in an oven at 60° C. for 30 minutes. The coatings obtained are stored at room temperature for 24 hours and then tested.

The scratch resistance of the surfaces of the resultant coatings was determined by means of the Crockmeter test (in accordance with EN ISO 105-X12 with 10 double rubs (back-and-forth strokes) and under an applied force of 9N, using 9 um abrasive paper (3M 281Q wet or dry TM productionTM), with subsequent determination of the residual gloss at 20° using a standard commercial gloss instrument. The Erichsen cupping of the resultant coatings was determined in accordance with DIN EN ISO 1520. The results in each case are set out in table 2. For the determination of the chemicals resistance, the metal plates described above and provided with the cured coatings (metal gradient-oven plates from Byk-Gardner) have drops (approximately 0.25 ml) of the test substance applied to them by means of a pipette, at intervals of 2 cm. In a temperature gradient oven (from Byk-Gardner), they are subjected to a temperature gradient, in the longitudinal direction of the plate, from 35 to 80° C. for 30 minutes. Following exposure to the substances, the substances are removed under running water and the damage is assessed visually after 24 hours. For assessment of the resistance, the range (temperature) of first visible attack on the clearcoat is reported. The results are given in table 2.

TABLE 2

Compilation of the test results for the inventive and comparative examples

|  | Inventive example 1 | Inventive example 2 | Comparative example C1 |
| --- | --- | --- | --- |
| 1% sulfuric acid | 51 | 52 | 51 |
| 10% hydrochloric acid | 47 | 51 | 46 |
| 5% aqueous sodium hydroxide solution | 52 | 48 | <36 |
| Water | >76 | >77 | >76 |
| 20° gloss | 62 | 70 | 74 |
| Gloss after 10 double rubs and after reflow 1 h 60° C. | 48 | 66 | 63 |
| Gloss retention after 10 double rubs and after reflow 1 h 60° C. | 77% | 94% | 85% |
| Erichsen cupping (mm) | 9.1 | 9.3 | 8.7 |

Discussion of the Test Results:

The coatings of the invention from examples I1 and I2 exhibit good chemical resistance not only against acidic reagents but also against aqueous sodium hydroxide solution and against water, whereas the coating composition of comparative example C1 exhibits an inadequate resistance toward aqueous sodium hydroxide solution. Moreover, the coatings of the invention from examples I1 and I2 show better Erichsen cupping than the coating of comparative example C1. The scratch resistance of all of the coatings is good.

What is claimed is:

1. An aqueous coating composition, comprising:
   at least one hydroxyl-containing compound (A),
   at least one compound (B) having free and/or blocked isocyanate groups and also having hydrolyzable, silane groups prepared from a polyisocyanate (PI), and
   at least one catalyst (C) for the crosslinking of silane groups,
   wherein the compound (B) comprises 10 mol % to less than 90 mol %, based on the entirety of structural units (I) and (II), of at least one structural unit of the formula (I)

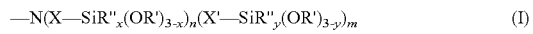    (I)

wherein
   R'=hydrogen, alkyl or cycloalkyl, wherein the alkyl or cycloalkyl carbon chain can be interrupted by nonadjacent oxygen, sulfur or NRa groups, wherein Ra=alkyl, cycloalkyl, aryl or aralkyl,
   X, X'=linear and/or branched alkylene or cycloalkylene groups having 1 to 20 carbon atoms, R"=alkyl, cycloalkyl, aryl or aralkyl, wherein the alkyl, cycloalkyl, aryl or aralkyl carbon chain can be interrupted by nonadjacent oxygen, sulfur or NRa groups, wherein Ra=alkyl, cycloalkyl, aryl or aralkyl, n=0 to 2,
   m=0 to 2,
   m+n=2,
   x=0 to 2, and
   y=0 to 2, and
   more than 10 mol % to 90 mol %, based on the entirety of the structural units (I) and (II), of at least one structural unit of the formula (II)

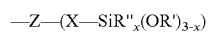    (II), wherein
   Z=—NH—, —NR—, —O— or —S—, where
   R=alkyl, cycloalkyl, aryl or aralkyl, wherein the alkyl, cycloalkyl, aryl, or aralkyl carbon chain can be interrupted by nonadjacent oxygen, sulfur or NRa groups, herein Ra=alkyl, cycloalkyl, aryl or aralkyl,
   x=0 to 2, and
   X, R' and R" have the definition indicated for formula (I),
   and a fraction in the compound (PI) of the isocyanate groups that have been reacted to form the structural units (I) and (II) is between 10 and 60 mol %.

2. The aqueous coating composition of claim 1, wherein the compound (B) has
   between 20 and 80 mol %, based in each case on the entirety of the structural units (I) and (II), of at least one structural unit of the formula (I)
   and
   between 20 and 80 mol %, based in each case on the entirety of the structural units (I) and (II), of at least one structural unit of the formula (II).

3. The aqueous coating composition of claim 2, wherein the compound (B) has
   between 30 and 70 mol %, based in each case on the entirety of the structural units (I) and (II), of at least one structural unit of the formula (I)
   and
   between 30 and 70 mol %, based in each case on the entirety of the structural units (I) and (II), of at least one structural unit of the formula (II).

4. The aqueous coating composition of claim 1, wherein the isocyanate-group-containing compound (B) comprises hydrophilic groups selected from the group consisting of polyether groups, groups capable of forming anions, and mixtures thereof.

5. The aqueous coating composition of claim 4, wherein the isocyanate-group-containing compound (B) comprises hydrophilic groups selected from the group consisting of carboxyl groups, phosphoric acid groups, phosphonic acid groups, sulfonic acid groups and mixtures thereof.

6. The aqueous coating composition of claim 1, wherein the compound (B) is produced by the reaction of some of the isocyanate groups of a polyisocyanate (PI) with a mixture of
   at least one compound (Ia)

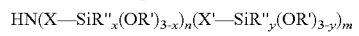    (Ia)

and
   at least one compound (IIa)

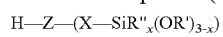    (IIa).

7. The aqueous coating composition of claim 6, wherein the polyisocyanate (PI) is selected from the group consisting of 1,6-hexamethylene diisocyanate, isophorone diisocyanate, 4,4'-methylenedicyclohexyl diisocyanate, biuret dimers of the aforementioned polyisocyanates, isocyanurate trimers of the aforementioned polyisocyanates, and mixtures thereof.

8. The aqueous coating composition of claim 1, wherein the fraction in the compound (PI) of the isocyanate groups that have been reacted to form the structural units (I) and (II) is between 20 and 50 mol %.

9. The aqueous coating composition of claim 8, wherein the fraction in the compound (PI) of the isocyanate groups that have been reacted to form the structural units (I) and (II) is between 20 to 40 mol %.

10. The aqueous coating composition of claim 1, wherein the catalyst (C) comprises phosphorus, nitrogen or a mixture thereof.

11. The aqueous coating composition of claim 1, wherein the hydroxyl-containing compound (A) is water-dilutable.

12. The aqueous coating composition of claim 1, wherein the hydroxyl-containing compound (A) comprises an Oil number of 30 to 400 mg KOH/g or the hydroxyl-containing compound (A) comprises an acid number of 30 to 1 mgKOH/g.

13. The aqueous coating composition of claim 1, wherein the hydroxyl-containing compound (A) comprises at least one member selected from the group consisting of a poly(meth)acrylate resin, a polyester resin, a polyurethane resin, or a mixture thereof.

14. The aqueous coating composition of claim 13, wherein the hydroxyl-containing compound (A) comprises an OH number of 100 to 300 mg KOH/g, or the hydroxyl-containing compound (A) comprises an acid number of 20 to 5 mg KOH/g.

15. The aqueous coating composition of claim 1, wherein the hydroxyl-containing compound (A) is made by reacting, in an organic solvent or in a solvent mixture, a hydroxyl-containing and acid-group-containing oligomer and/or polymer, subjecting the resulting oligomer and/or polymer to partial neutralization, and dispersing them/it in water.

16. The aqueous coating composition of claim 1, wherein the coating composition is a two-component or multicomponent coating composition comprising
(I) a component (I) comprising the hydroxyl-containing compound (A),
(II) a component (II) comprising the compound (B) and the catalyst (C),
and optionally
(III) a component (III) comprising additional constituents of the aqueous coating composition.

17. A multistage coating method which comprises applying, to an optionally precoated substrate, a pigmented basecoat film and thereafter a film of the aqueous coating composition of claim 1.

18. The multistage coating method of claim 17, wherein the application of the pigmented basecoat film to make an applied basecoat is followed by drying of the applied basecoat initially at temperatures from room temperature to 80° C. and, following the application of the aqueous coating composition, by curing at temperatures from 30 to 200° C. for a time of 1 minute up to 10 hours.

19. A method of finishing a automotive substrate, comprising applying the aqueous coating composition of claim 1 to an automotive substrate selected from the group consisting of never finished OEM automotive substrates or previously finished OEM automotive substrates.

20. The method of claim 19, wherein the aqueous coating is a clearcoat.

* * * * *